United States Patent [19]

Millet et al.

[11] 4,203,650
[45] May 20, 1980

[54] CONNECTOR FOR SIMULTANEOUS END-TO-END CONNECTION OF GROUPS OF SEVEN OPTICAL FIBRES

[75] Inventors: Christian Millet, Meyzieu; Francis Gauthier, Pelussin, both of France

[73] Assignee: Les Cables de Lyon, Lyons, France

[21] Appl. No.: 911,242

[22] Filed: May 31, 1978

[30] Foreign Application Priority Data

May 31, 1977 [FR] France .................. 77 16566

[51] Int. Cl.² ............................................. G02B 5/14
[52] U.S. Cl. ............................. 350/96.21; 350/96.22
[58] Field of Search ................ 350/96.20, 96.21, 96.22

[56] References Cited

U.S. PATENT DOCUMENTS

| | | | |
|---|---|---|---|
| 3,846,010 | 11/1974 | Love et al. ................ | 350/96.22 |
| 3,846,018 | 2/1975 | Miller ...................... | 350/96.21 |
| 3,914,015 | 10/1975 | McCartney ................ | 350/96.20 |
| 4,056,305 | 11/1977 | McCartney et al. ........ | 350/96.21 |
| 4,094,580 | 6/1978 | Cook et al. ................ | 350/96.21 |
| 4,109,994 | 8/1978 | Chown .................... | 350/96.21 |
| 4,132,461 | 1/1979 | Jaques et al. ............. | 350/96.21 |

FOREIGN PATENT DOCUMENTS 2516662 7/1976 Fed. Rep. of Germany ........ 350/96.21

*Primary Examiner*—Rolf G. Hille
*Attorney, Agent, or Firm*—Sughrue, Rothwell, Mion, Zinn and Macpeak

[57] ABSTRACT

Connector for simultaneous end-to-end connection of groups of seven optical fibres. The ends of the groups of fibres to be connected are brought into mutual radial contact in a centered hexagonal configuration, e.g. by a guide structure (8) and associated clamping device (9), and their end faces of two groups are then brought into contact with each other. Particularly intended for on site connections of optical cables.

8 Claims, 9 Drawing Figures

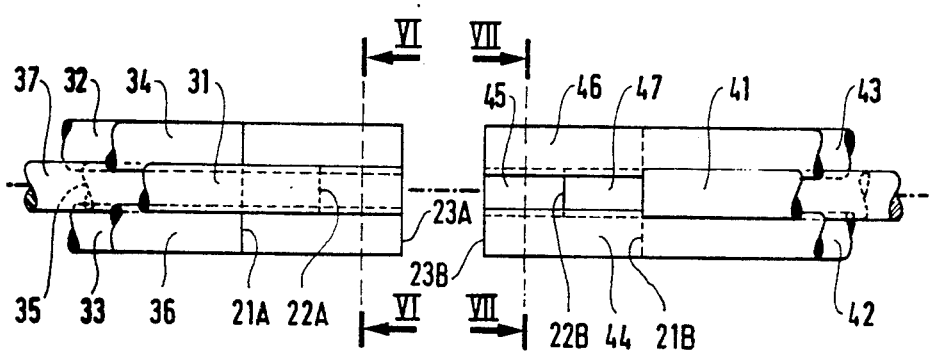
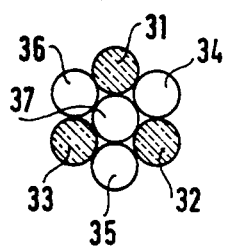
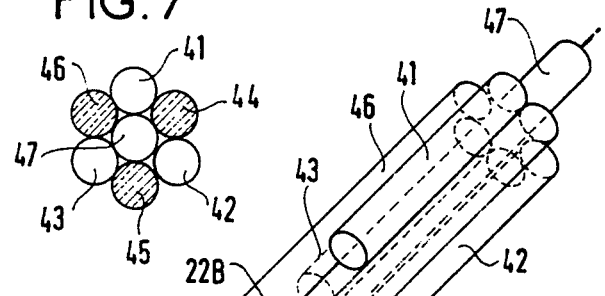
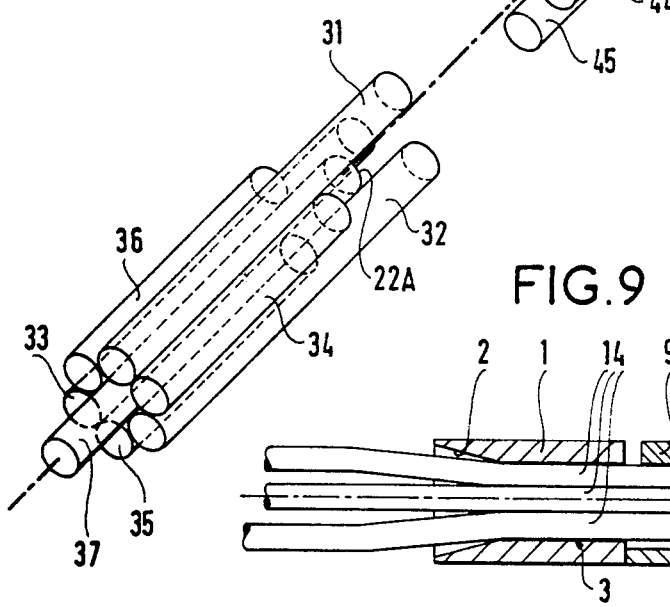
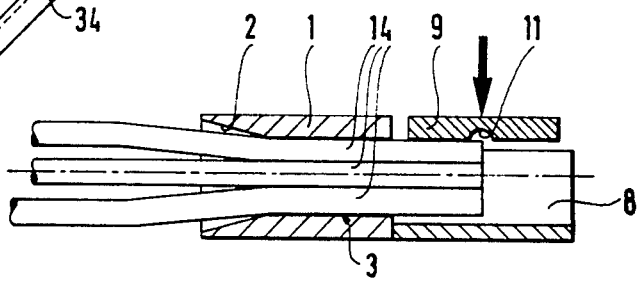

CONNECTOR FOR SIMULTANEOUS END-TO-END CONNECTION OF GROUPS OF SEVEN OPTICAL FIBRES

The present invention relates to a connector for simultaneous connection of two groups of seven optical fibres, each fibre having a protective covering.

In known connectors each fibre is placed in its own guide structure after prior preparation, cleaning and cutting. This succession of operations becomes, by repetition a drawback when it is desired to connect cables which include a very large number of fibres. Further, the guide structures and clamping devices of the fibres are very bulky, a long time is required to connect the set of fibres, and the machining tolerances must be very fine and reproduceable in order to obtain good performance of the connected fibres.

U.S. Pat. No. 3,914,015 describes a connector for simultaneous connection of a bundle of bare optical fibres used for conveying a single image. A heat shrinkable sleeve is placed around the end of each bundle to apply a sufficient force to the fibres for them to take up the desired optimum close-packed hexagonal pattern. Such a connector is not suitable for bringing into mutual radial contact the stripped ends of seven covered optical fibres which are not already brought together in a bundle of bare fibres.

Preferred embodiments of the present invention enable a large number of covered optical fibres to be connected end-to-end in a simpler and quicker manner than the previous one by one methods, while using simple guiding structures and clamping devices of little bulk. They ensure good performance of the connected fibres, (in particular low attenuation) compatible with proposed optical transmission systems and do not require rigorous checking of the machining tolerances of the parts used. These preferred connectors comprise a small number of parts whose machining is precise but simple.

The present invention provides a connector for simultaneous end-to-end connections of seven optical fibres, each fibre having a protective covering, the connector comprising means for bringing the ends of each group of fibres into mutual radial contact in a centred hexagonal configuration, and means for bringing the end faces of the fibres into contact with the opposing end faces.

The connector preferably includes at least one of the following characteristics:

the means for bringing the ends of each group of fibres into mutual radial contact in a central hexagonal configuration comprise a generally V-shaped guide structure and a clamping device for pressing the fibres towards the bottom of the V in a direction lying in the longitudinal plane of symmetry of the V and perpendicular to the angle at the bottom;

the means for bringing the ends of each group of fibres into mutual radial contact in a centred hexagonal configuration are contituted by cement injected into a mold which presses tne fibres into the said centred hexagonal configurati. n;

the means for bringing the end faces of the fibres into contact with the opposing end faces comprise end pieces having respective inlets whose right cross-sections taper towards a bore whose right cross-section is slightly smaller than that of the circle circumscribing the centred hexagonal configuration of the covered fibres;

for use with fibres which are not exactly centred in their protective coverings and therefore requiring their ends to be stripped, the bores of the end pieces are extended on their respective fibre end sides by a funnel shape of tapering right cross-section extending into respective polygonal or circular conduits for passing the stripped fibres in a centred hexagonal configuration with a little play;

each end piece includes an angular position mark on its periphery;

the means for bringing the end faces of the fibres into contact with the opposing end faces include means for reciprocal longitudinal adjustment of the positions of the end faces of the touching peripheral fibres into at least two different planes and preferably with the central fibres in a plane equidistant from the two preceding planes.

The invention also relates to a method of simultaneous end-to-end connection of two groups of seven optical fibres using the above connector, having means for bringing the end faces of the fibres into contact with the opposing end faces include means for reciprocal longitudinal adjustment of the positions of the end faces of the touching peripheral fibres in at least two different planes, wherein the peripheral fibres whose end faces are in a plane ahead of the mean connection plane are brought into contact with peripheral fibres whose end faces are in a plane behind the mean connection plane and preferably wherein the end faces of the central fibres are brought into contact in the mean connection plane.

Naturally, the method and the connector for simultaneous connection which have been defined above can be applied to groups of optical fibres which are greater than seven, these groups then being sub-divided in groups of seven and the remaining fibres (being less than seven in number) then being connected by conventional one-by-one means.

In the connector with seven optical fibre groups concentrically adjacent each other in a centred hexagonal configuration, the six fibres pressed against one central fibre define, in a plane perpendicular to the fibres, a hexagonal configuration of the axes of the peripheral fibres. The position of the axis of each fibre is precisely defined with respect to the central axis if the fibres are equipped with a convering of constant diameter and are accurately centred therein. A reproduceable self-positioning of the fibres can thus be obtained. The connection then consists simply in coupling two identical end pieces end-to-end each one including a group of seven fibres and then placing them opposite to each other using a single, common guide structure.

An optical transmission medium can be placed between the end faces of the fibres, provided that the connection takes place in a sealed housing. It can also be used to cement the assembly of the fibre ends thereby forming a splice.

Connectors for simultaneous connections of groups of seven optical fibres in accordance with the invention and described below by way of example and with reference to the figures of the accompanying drawings, in which:

FIG. 5 is a schematic elevation of a disposition of the fibres with their end faces staggered to ensure self-alignment of a tenon and mortise type of nesting without the use of a guide structure;

FIG. 6 is a section through the fibres along VI—VI of FIG. 5;

FIG. 7 is a section through the fibres along VII—VII of FIG. 5;

FIG. 8 is a perspective view of the respective dispositions of the ends of the fibres of the two groups to be connected before they are brought into contact; and FIG. 9 is an axial section through an end piece having a conical inlet for a group of seven non-stripped fibres, together with the adjacent guide structure and clamping device for their ends.

Figure 1:
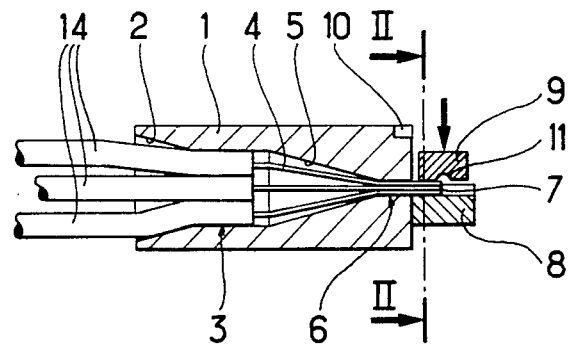
FIG. 1 is an axial section through an end piece having a conical inlet for a group of seven optical fibres with stripped ends, and through the adjacent guide structure and clamping device for the ends of the fibres.
Figure 2:
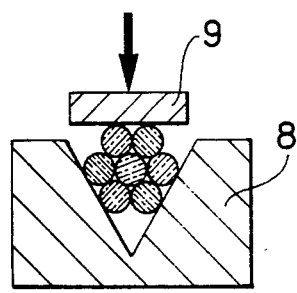
FIG. 2 is a section along II—II of FIG. 1.
Figure 3:
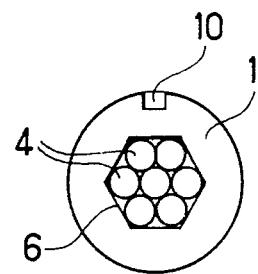
FIG. 3 is an end view of the end piece of FIG. 1, showing an angular position mark.

Optical fibres 14 are stripped over a defined length and then inserted into the connector shown in FIGS. 1 to 3. The optical quality end faces of the fibres are prepared, for example, by cutting with a diamond-edged cutting tool. They are then inserted in sevens into a cylindrical end piece 1 having a conical inlet 2 (or any other shape having a tapering cross-section, e.g. a bottle-neck shape), followed by a cylindrical bore 3 having a diameter which is very slightly less than that of the circle circumscribing the six peripheral covered fibres. They are held there, either by the pressure due to the elastic deformation of their protective coverings, or by concentric elastic deformation of the end piece. Simultaneously, the stripped ends 4 project into a funnel shape having a conical inlet 5 and ending in an orifice 6. The end faces of the seven fibres must be placed in the same plane 7. This can be obtained by sliding them in the orifice 6 whose size is very slightly larger than the diameter of the circle circumscribing the six peripheral stripped fibres. The lengths are automatically adjusted when the end faces of the fibres 14 are brought into contact with a stop in the plane 7 since a small amount of slack is taken up in the conical inlet 5.

The length over which the stripped ends 4 of the fibres are guided in the orifice 6 must be sufficient for proper stacking in a centred hexagonal structure (see FIGS. 2 and 3) for application of the bundle of fibres to a guide structure in the form of a block 8. The guide block 8 may, for example as shown in FIG. 2 include a V with a 60° angle and guide the fibres with the aid of a clamping device in the form of a thrust pad 9. This guide length is in the order of a few millimeters at most.

Once two identical end pieces have been prepared and provided with fibres to be connected, the two bundles of seven fibres are applied end-to-end to each other on the guide block 8 having a 60° V. Preferably, each end piece is provided with a marker 10 in its end adjacent the guide block to indicate the angular position of the fibres in the end piece, to facilitate end-to-end application of the fibres (see FIG. 3). While the thrust pad 9 is exerting a sufficiently low pressure for the two bundles to be able to slide, an optical transmission medium, such as a liquid or a grease having a well-defined retractive index, is inserted between the ends of the two bundles in the plane of their joint 7; thereafter the assembly is clamped by increasing the pressure exerted by the pad 9. It is preferable for the pad to include a recess 11 in the joint plane 7 to avoid any pad material being pinched between the end faces of the fibres to be connected. The thrust of the pad on the fibres may be provided by compression of an elastomer, by a spring or by any other appropriate means.

The material providing the optical transmission medium placed between the end faces to be connected, can also have the role of cementing the assembly to form a splice. It could be a resin or a melted glass.

Figure 4:
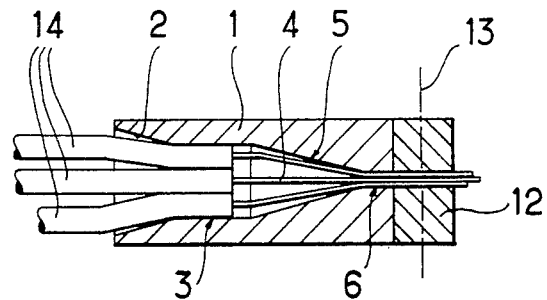
FIG. 4 is an axial section through an end piece having a conical inlet and a mold for fixing the fibres by injection of a binder.

In the connector shown in FIG. 4, the optical fibres 14 are likewise stripped over a defined length by any appropriate means. As for the connectors shown in FIGS. 1 to 3, the fibres are inserted by sevens into a cylindrical end piece 1 having a conical inlet 2 followed by a cylindrical bore 3 which holds them by pressing on their converings. The stripped ends 4 of the fibres project into the conical inlet 5 which ends in an orifice 6 having a hexagonal right cross-section followed by a mold 12 for pressing the fibres into a centred hexagonal configuration. The fibres are then cemented in this position by injecting polymerisable resin (a polyester, a polyacrylic, epoxy, etc. resin) or any other material capable of acting as a binder (glass etc.). After polymerisation of the resin, if any, and at any rate when the cohesion is sufficiently rigid, the assembly is sawn perpendicularly to the axis of the fibres to obtain a junction plane 13, thereafter it is unmolded.

The two bundles thus obtained are then placed in abutment against each other in a guide structure having a clamping device analogous to those of FIG. 2.

The end piece 1 may simply be an intermediate unit for use in assembly since it is not necessary for the join per se which is provided by the guide structure and the thrust pad.

In the connector shown in FIGS. 5 to 8, the ends of the fibres are likewise prior-stripped over a defined length. The optical quality end faces of the fibres are provided by means of an appropriate tool. The fibres are inserted in groups of seven into a cylindrical end piece analogous to that of FIGS. 1 to 4 which holds them by pressure. The stripped ends project into the conical inlet shape. However, the end faces of the seven fibres are placed in three different planes 21A, 22A and 23A or 21B, 22B and 23B respectively, in such a manner that the groups of fibres interpenetrate and provide guide means for each other. This tenon and mortise type of nesting eliminates the need for a guide structure. The left-hand centre fibre has its end face in the plane 22A, and every other left-hand peripheral fibre has its end face in the plane 21A which is behind and to the left of the plane 22A and a few millimeters therefrom at most. The remaining left-hand peripheral fibres have their end faces in the plane 23A ahead of and to the right of plane 22A. Alternate peripheral fibres have their end faces in the planes 21A and 23A. The disposition of the right-hand fibres is complementary so as to enable each group of fibres to have identically arranged terminal parts which can be connected to each other by sliding and nesting of the fibres amongst each other. The fibres are thus self-aligned. Each portion of fibre is positioned by the three fibres which are tangental thereto. The longitudinal sliding of each fibre enables self-adjustment of the lengths necessary for causing each pair of opposing end faces to press against each other by taking up the stack in the conical inlet shape.

FIGS. 6 to 8 show the left-hand fibres of FIG. 5, - 31, 32 and 33 in cross-section in the plane VI—VI of FIG. 5; the fibres 34, 35, 36 set back behind this plane and the central fibre 34 in the plane. These figures also show the right-hand fibres of the FIG. 5—44,45 and 46 in cross-section in the plane VII—VII of FIG. 5; the fibres 41, 42 and 43 set back behind this plane, and the central fibre 47.

The two bundles are fixed with respect to each other by a means for concentric tightening of the fibres, eg a guide block with a 60° V and a thrust pad, a deformable cylinder or a thermo-tightening sheath.

The connector shown in FIG. 9 is similar to that of FIG. 1, but it is adapted to connect covered fibres 14 whose ends have not been stripped. Because of this, the cylindrical end piece 1 having a conical inlet 2 does not include a funnel shape for guiding the stripped fibres as those of FIGS. 1 and 4. The 60° V-shaped guide block 8 and the thrust pad 9, however, are analogeous to those of FIGS. 1 and 4.

Naturally fibres covered up to their ends could also be used with a cement injection mold analogous to that of FIG. 4 or with their ends offset in three different planes to provide a tenon and mortise assembly analogous to that shown in FIGS. 5 to 8.

While the connectors which have been described with reference to the figures appear to be preferred forms, it will be understood that modifications can be made thereto without going beyond the scope of the invention, various of their units being replaceable by others which perform the same technical function.

The connectors of the invention are applicable more particularly to on site connection of optical cables in a simple and rapid manner.

What is claimed is:

1. A connector for simultaneous end-to-end connection of two groups of seven optical fibres, each fibre having a protective covering, said connector comprising:
    opposite end pieces having oppositely directed tapering funnels leading to orifices of a size corresponding to the diameter of the circle circumscribing the assembly of the seven fibres in a centered, hexagonal configuration, and
    means for alternate reciprocal longitudinal adjustment of the positions of the end faces of the peripheral fibres into two different planes relative to a mean connection plane intermediate of said end pieces,
    a first plane ahead of the mean connection plane and a second plane behind the mean connection plane and symmetrically of the first plane.

2. A connector according to claim 1, further comprising means for adjustment of the end faces of the central fibres into the mean connection plane.

3. A connector according to claim 1, wherein each end piece further comprises an inlet bore for enclosing the unstripped parts of said optical fibres, said inlet bore having an orifice of a size corresponding to the diameter of the circle circumscribing the assembly of the seven stripped terminal lengths of said fibres in a centered hexagonal configuration.

4. A connector according to claim 2, wherein each end piece further comprises an inlet bore for enclosing the unstripped parts of said optical fibres, said inlet bore having an orifice of a size corresponding to the diameter of the circle circumscribing the assembly of the seven stripped terminal lengths of said fibres in a centered hexagonal configuration.

5. A method of simultaneous end-to-end connection of two groups of seven optical fibres, each fibre having a protective covering, in a connector comprising opposite end pieces having oppositely directed tapering funnels leading to orifices of a size corresponding to the diameter of the circle circumscribing the assembly of the seven fibres in a centered hexagonal configuration, said method comprising the steps of:
    introducing the respective groups of seven fibres in the respective end pieces through said tapering funnel with the end faces of the fibres protruding beyond their orifices, and
    bringing the ends of the respective fibres into mutual contact while adjusting the surfaces of contact of the peripheral fibres alternately into two different planes, a first plane ahead of a mean connection plane intermediate of said end pieces, and a second plane behind the mean connection plane, and symmetrically of said first plane.

6. A method of simultaneous end-to-end connection of two groups of seven optical fibres, each fibre having a protective covering and being stripped of its covering over a terminal length, said method comprising the steps of:
    (1) introducing the fibres into end pieces of a connector with the unstripped parts enclosed in an inlet bore and the stripped terminal lengths in a funnel leading to an orifice of a size corresponding to the diameter of the circle circumscribing the assembly of the seven stripped terminal lengths in a centered hexagonal configuration, and
    (2) effecting the protrusion of said fibres beyond said orifice, and
    (3) bringing the end faces of the respective fibres into mutual contact while adjusting the surfaces of contact of the peripheral fibres alternately into two different planes, a first plane ahead of a mean connection plane intermediate of said end piece and a second plane behind the main connection plane, symmetrically of said first plane.

7. A method according to claim 5, further comprising the step of adjusting the surface of contact of the central fibres into the mean connection plane.

8. A method according to claim 6, further comprising adjusting the surface of contact of the cnetral fibres into the mean connection plane.

* * * * *